Patented Aug. 5, 1924.

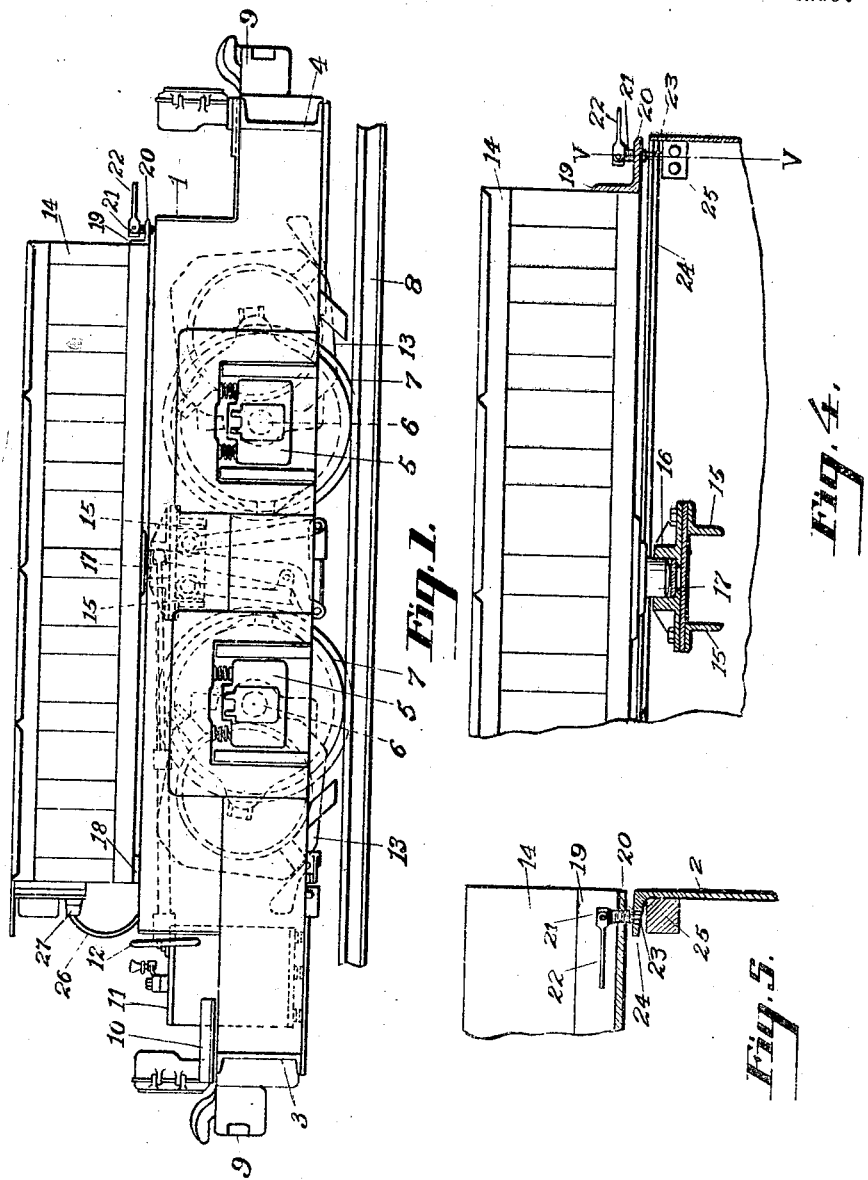

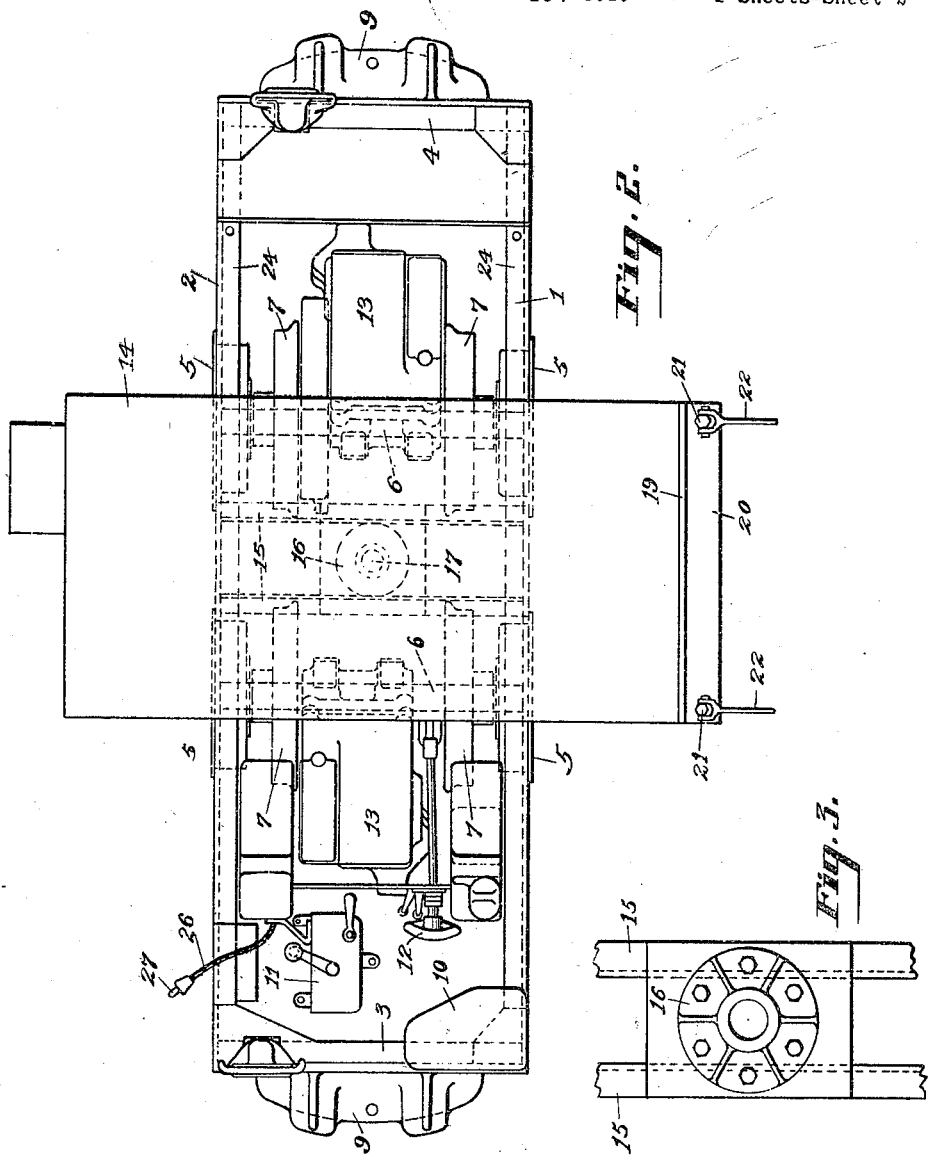

1,503,699

UNITED STATES PATENT OFFICE.

LAWRENCE H. MICHAELIS, OF COLUMBUS, OHIO, ASSIGNOR TO THE JEFFREY MANUFACTURING COMPANY, OF COLUMBUS, OHIO, A CORPORATION OF OHIO.

ELECTRIC LOCOMOTIVE.

Application filed June 16, 1919. Serial No. 304,587.

*To all whom it may concern:*

Be it known that I, LAWRENCE H. MICHAELIS, a citizen of the United States, residing at Columbus, in the county of Franklin and State of Ohio, have invented certain new and useful Improvements in Electric Locomotives, of which the following is a specification, reference being had therein to the accompanying drawing.

The present invention relates to certain new and useful improvements in electric locomotives adapted to use in the narrow and tortuous passages of mines and particularly to that class of locomotives which is provided with storage batteries from which electric current may be derived for the actuation of the propelling motors.

In the mining of coal the dislodged material is loaded into convenient cars and hauled over tracks extending from the working faces along the entry to the mouth of the mine. Generally speaking the most convenient means for propelling these cars along the thoroughfares of the mines is the electric locomotive arranged to receive energy from suitably positioned trolley wires. It is usually inexpedient, however, to extend the trolley wires into the rooms where the principal mining operations are conducted, and relatively small gathering locomotives, equipped with storage batteries, are commonly provided to assemble the loaded cars from the working places into trains accessible to the trolley equipped locomotive. The entries and passages of such mines are commonly very narrow, and the curves of the track are of short radius placing very narrow limits upon the permissible dimensions of locomotives intended for such service. Because of these limitations, and the weight and dimensions of a battery of sufficient capacity to efficiently operate the locomotive throughout a working day, the batteries have commonly been placed directly above the driving wheels, and when so placed cover the propelling motors to such a degree as to prevent convenient access to the motors and other operative parts of the locomotive for inspection and repairs.

It is the especial object of this invention to provide a locomotive of the class described with a battery box positioned above the driving wheel and motors and so mounted that it may be conveniently shifted upon the frame of the locomotive to give convenient access to the parts beneath.

This and other objects will appear in the following specification, reference being had to the accompanying drawings of which Fig. 1 is a side elevation of a locomotive equipped with the devices of my invention.

Fig. 2 is a general plan view of the locomotive illustrated in Fig. 1, showing the battery box moved into position to give access to the propelling motors.

Fig. 3 is a fragmentary detail of the pivot bearing upon which the battery box is supported.

Fig. 4 is a fragmentary section taken along the longitudinal vertical central plane of the locomotive.

Fig. 5 is a fragmentary transverse section taken along the line V—V of Fig. 4.

Like numerals refer to similar parts in the several figures.

In the drawings the numerals 1 and 2 indicate the side frames, and 3 and 4 the end frames which are rigidly secured together to form the frame of the locomotive. In the side frames 1 and 2 are mounted in any usual or preferred manner the journal boxes 5 in which the axles 6 are journaled. To the axles 6 are fixed the driving wheels 7 which support the entire weight of the locomotive upon the track rails 8. To the end frames 3 and 4 are attached buffer draw bars 9 by which the locomotive may be connected to its load, and upon the end frame 3 at the operating end of the locomotive, is arranged a saddle 10 for the accommodation of the motorman. The usual electric controller 11 and break operating hand wheel 12 are provided within convenient reach of the motorman. Mounted within the locomotive frame between the driving wheels 7 are the electric motors 13 by which the driving wheels are actuated through suitable gearing not shown in the drawings. As these parts are well understood in the art and form no part in the present invention, further description of them is not thought to be required at this time.

Positioned above the frame of the locomotive is a battery box 14 adapted to contain a storage battery suitable to actuate the motors 13. In order to obtain maximum tractive effort within the permissible horizontal dimensions of the locomotive this battery box must be positioned directly above the wheels 7. The dimensions of a storage battery of sufficient capacity to efficiently operate the locomotive for an entire working day are such that the battery box 14 completely covers the motors 13, and, as heretofore constructed, it has been necessary to hoist this battery box with its contained battery off of the locomotive whenever it became necessary to inspect or repair the motor. To overcome this difficulty I have provided the devices which are hereinafter described.

Extending transversely of the locomotive frame, midway between the vertical planes of the driving axles, are cross members 15 upon which are supported a central pivot bearing 16 adapted to engage a pivot member 17 depending from the bottom of the battery box. At one end the battery box is provided with a transverse bar 18 which constitutes a shoe adapted to bear upon the upper edges of the side frames 1 and 2. At the other end of the battery box there is attached a transverse angle bar 19 having a horizontally extending flange 20 through which are screw threaded the lifting screws 21. To the upper ends of the lifting screws 21 are hinged convenient hand wrenches 22 by which the screws may be manipulated. Formed on the lower ends of the lifting screws 21 are extensions 23 adapted to be projected through suitable apertures in the flanges 24 of the side frames 1 and 2 and to engage with suitable abutments 25 secured to said side frames. By the manipulation of the hand wrenches 22 the lifting screws 21 may be turned downwardly to cause the extensions 23 to press against the abutments 25 and lift that end of the battery box thereby causing the shoe 19 to bear upon the side frames of the locomotives dividing the weight of the battery box between the shoe 18 and the lifting screws 21. By the engagement of the extensions 23 with the apertures of the flanges 24 lateral displacement of the battery box is prevented. By turning the adjusting screws upwardly the battery box may be sufficiently lowered to cause the pivot member 17 to engage the bottom of the pivot bearing 16 to pivotally support the weight of the battery box. When the lifting screws are sufficiently withdrawn to release the extensions 23 from the apertures of the side frame the battery box may be turned upon the pivot 17 as shown in Fig. 2 of the drawings, to permit ready access to the motors and other parts normally lying below the battery box. A flexible conductor cable 26 having a detachable plug terminal 27 affords convenient means for disconnecting and reconnecting the battery with the circuits of the locomotive.

What I claim is:

1. In an electric locomotive, the combination with a main frame, of wheels to support said frame, a motor within the frame connected with said wheels to drive them, a storage battery to supply electric current for the actuation of said motor, a box for said battery normally supported above said motor upon said main frame and adapted to rotary movement thereon to afford convenient access to said motor and means for guiding the box during such movement.

2. In an electric locomotive, the combination with a main frame, of wheels to support said frame, a motor within the frame connected with the wheels to drive them, a storage battery to supply electric current for the actuation of said motor, a box for said battery normally supported above said motor upon said main frame and adapted to rotary movement thereon to afford convenient access to said motor, and means to secure said battery box in normal position upon said main frame during said movement.

3. In an electric locomotive, the combination with a main frame, of wheels to support said frame, a motor within the frame connected with said wheels to drive them, a storage battery to supply electric current for the actuation of said motor, a box for said battery pivotally mounted upon said main frame above said motor and adapted to be rotated about its pivot to give convenient access to said motor.

4. In an electric locomotive, the combination with a main frame, of wheels to support said frame, a motor within the frame connected with said wheels to drive them, a storage battery to supply electric current for the actuation of said motor, a pivot bearing carried by said main frame, a box for said storage battery supported upon said pivot bearing in operative position above said motor and rotatable thereon to afford convenient access to said motor.

5. In an electric locomotive, the combination with a main frame, of wheels to support said frame, a motor within the frame connected with said wheels to drive them, a storage battery to supply electric current for the actuation of said motor, a pivot bearing carried by said main frame, a box for said storage battery supported upon said pivot bearing in operative position above said main frame and rotatable thereon to afford convenient access to said motor, and means to secure said battery box in normal operative position above said main frame.

6. In an electric locomotive, the combination with a main frame, of wheels to support said frame, a motor within the frame connected with said wheels to drive them, a storage battery to supply electric current for the actuation of said motor, a pivot bearing carried by said main frame, a box for said battery normally supported above said motor upon said main frame and adapted to be rotated upon said bearing to afford convenient access to said motor.

7. The combination of the motor, the frame surrounding it, the storage battery to supply current, the battery box normally located in a position above the motor and movable from said position to another to permit access to the motor, permanently interengaging devices respectively connected with the frame and with the box and adapted, while they are in engagement, to permit the box to move from one of said positions to the other.

8. The combination of the motor, the frame surrounding it, the storage battery to supply current, the battery box normally located in a position above said motor and movable from said position to another to permit access to the motor, permanently interengaging devices respectively connected with the frame and with the box and adapted, while in engagement, to permit relative movement of the box from one of said positions to the other, and supplemental means for positively holding the box against such movements.

9. The combination of the frame, the motor therein, the storage battery to supply current, the battery box normally located on the frame in a position above the motor and movable from the said position to another to permit access to the motor, a support for the box at the center thereof, a supplemental support for the ends of the box, one of the said supports sustaining the weight of the box while it is moving relatively to the frame, and means for transferring the weight of the box from one of said supports to the other.

10. The combination of the frame, the motor within it, the storage battery to supply current, the battery box normally located on the frame in a position above the motor and movable from said position to another to permit access to the motor, a support at the center of the box which sustains it while it is moving as aforesaid, a supplemental support for the ends of the box, and means for transferring the weight of the box from one of said supports to the other.

11. In an electric locomotive, the combination with a main frame, of wheels to support the frame, a motor within the frame connected with the wheels to drive them, a storage battery to supply electric current for the actuation of said motor, a box for said battery attached to said frame and supported thereby above said motor and connected and arranged for movement in horizontal planes to afford access to said motor.

12. In an electric locomotive, the combination with a main frame, of wheels to support said frame, a motor within the frame connected with the wheels to drive them, a storage battery to supply electric current for the actuation of said motor, a box for said battery attached to said frame and supported thereby above said motor and connected and arranged for movement in horizontal planes to afford access to said motor, and means to secure said battery box in normal working position.

13. A storage battery locomotive, comprising a frame, a motor on said frame for propelling the locomotive, a substantially oblong shaped battery box arranged longitudinally of said frame and normally positioned so that it projects over said motor, and means for enabling said battery box to be arranged transversely of the frame without disconnecting it from the frame so as to gain access to said motor.

14. A storage battery locomotive, comprising a frame, a motor on said frame for propelling the locomotive, and a battery box rotatably mounted on said frame and normally positioned so that a portion of same projects over said motor.

15. A storage battery locomotive, comprising a frame, a motor on said frame, a battery box that normally extends over said motor, and a turn table on said frame that carries said battery box.

In testimony whereof, I affix my signature, in presence of two witnesses.

LAWRENCE H. MICHAELIS.

Witnesses:
ANNA M. FENLON,
HARRY C. DEAN.